F. JACKSON.
SKINNING TOOL.
APPLICATION FILED NOV. 23, 1908.
964,865.
Patented July 19, 1910.
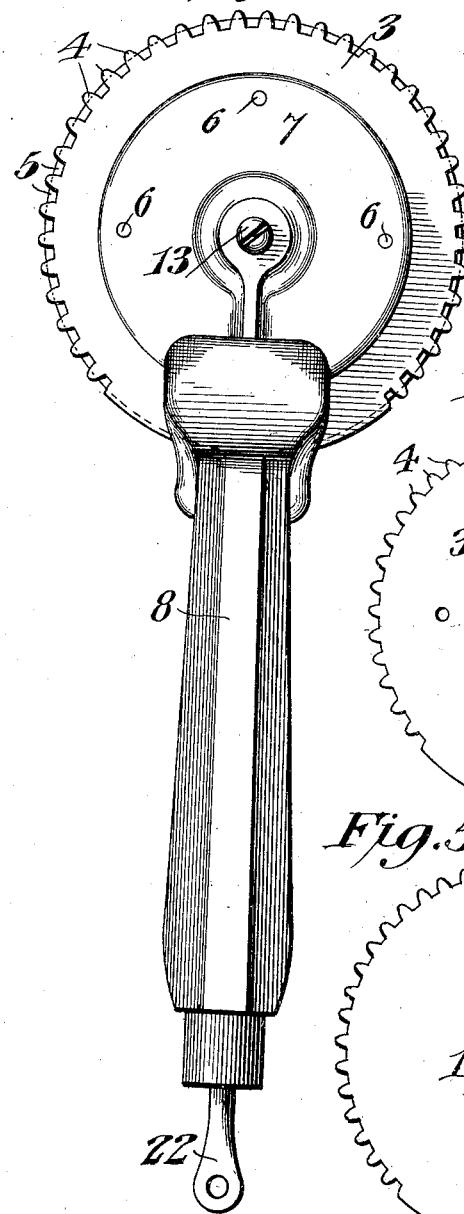
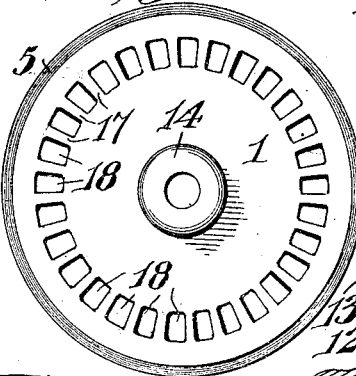
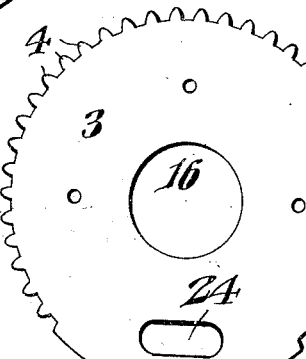
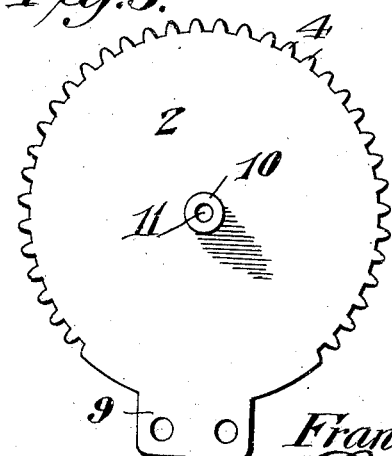
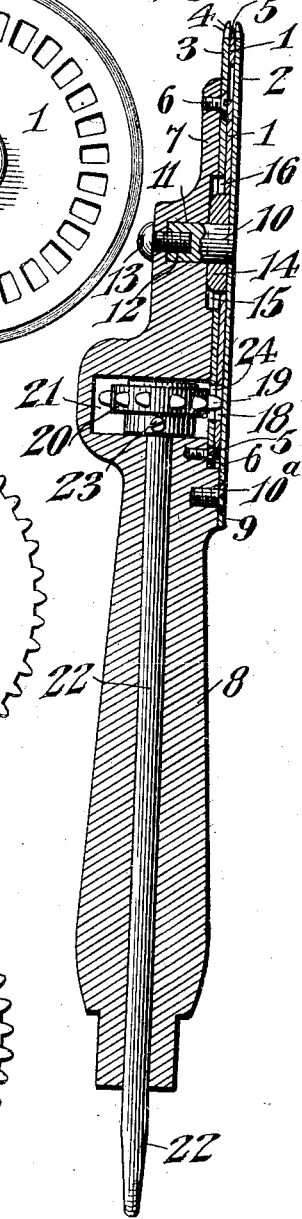
Witnesses
Jas. F. McCathran
J. F. Riley
Inventor
Frank Jackson
By E. G. Siggers
J. F. Siggers
Attorneys
THE NORRIS PETERS CO., WASHINGTON, D. C.

UNITED STATES PATENT OFFICE.

FRANK JACKSON, OF CHICAGO, ILLINOIS.

SKINNING-TOOL.

964,865.  Specification of Letters Patent.  Patented July 19, 1910.

Application filed November 23, 1908. Serial No. 464,005.

*To all whom it may concern:*

Be it known that I, FRANK JACKSON, a citizen of the United States, residing at Chicago, in the county of Cook and State of Illinois, have invented certain new and useful Improvements in Skinning - Tools, of which the following is a specification.

The invention relates to improvements in skinning tools.

The object of the present invention is to improve the construction of skinning tools, and to provide a simple, inexpensive and efficient skinning tool possessing strength, durability and lightness, designed particularly for removing the hides from cattle and capable of enabling the tissue, which connects the hide with the flesh, to be rapidly severed without cutting, scoring or otherwise injuring the hide or damaging the appearance of the meat.

A further object of the invention is to provide a skinning tool having a rotary knife and equipped with means, located at both sides of the knife and projecting outwardly beyond the cutting edge thereof and arranged to prevent the cutting edge from coming in contact with the hide or skin without interfering with the free action of the knife on the tissue.

Another object of the invention is to provide a skinning tool adapted to permit a skin or hide to be removed from an animal with perfect safety and with greater rapidity than heretofore, whereby a great amount of work, usually requiring a skilled operator, may be performed in a comparatively short space of time by a novice with perfect safety.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a rear elevation of a skinning tool, constructed in accordance with this invention. Fig. 2 is a longitudinal sectional view of the same. Fig. 3 is a plan view of the rotary knife. Fig. 4 is a detail view of the inner or rear guard. Fig. 5 is a similar view of the outer or front guard.

Like numerals of reference designate corresponding parts in all the figures of the drawing.

The skinning tool comprises in its construction a circular rotary knife 1 and front and rear guards 2 and 3, consisting of substantially circular plates, arranged in parallelism with the knife and provided with peripheral projections or teeth 4, located at opposite sides of and projecting outwardly beyond the cutting edge 5 of the knife and arranged to prevent the skin or hide from coming in contact with the cutting edge when the tool is presented to the same in any position, whereby all danger of cutting, scoring or otherwise impairing the value of a skin or hide will be effectually eliminated. Also the guards are adapted to prevent the skinning tool from damaging the appearance of the meat. The projections or teeth, which are arranged at regular intervals, permit the rotary knife to operate effectively on the connecting tissue when the tool is moved in any direction. The teeth of the guards are short and project only a slight distance beyond the blade, and the elasticity of the tissue, which connects the hide to the carcass, permits the teeth to be embedded in it a sufficient distance for the knife to come in contact with the tissue and sever the same. The tissue slips by the points of the teeth and between the latter, and is freely exposed to the action of the knife. The rotary knife, which is actuated by the means hereinafter described, is capable of rapidly severing the tissue, which connects the hide with the flesh, and as the projecting guard teeth enable the tool to slide along the skin without permitting the knife to come in contact with the same, the skin or hide may be more rapidly taken from an animal in a cleaner and better condition than heretofore, and at the same time the tool will enable the removal of a hide, which usually requires a skilled operator, to be performed by a novice with perfect safety. Also a greater amount of work of this character may be performed owing to the arrangement of the guards at both sides of the knife, so that the cutting edge is effectually prevented from coming in contact with the hide or skin no matter what position the tool is held.

The inner or rear guard is secured by screws 6, or other suitable fastening devices to a circular enlargement or head 7 of a handle 8, designed to be constructed of aluminum, or other suitable material. The outer or front guard is provided adjacent to the contiguous end of the handle with an extension 9, secured by screws 10ª, or other suitable fastening devices to the handle, as clearly shown in Fig. 2 of the drawing. The front guard or plate is also equipped with a centrally arranged shaft or spindle 10, fixed to the outer guard or plate and fitting in a central socket 11 of the head or enlargement 7 of the handle. The shaft or spindle is provided with a threaded opening 12 and is secured to the head or enlargement by a screw 13, piercing the head or enlargement at the socket and having its head arranged exteriorly of the same. The screws 6, which secure the inner or rear guard to the head or enlargement, have their heads counter-sunk in the guard 3.

The shaft or spindle forms a journal for the rotary knife, which is provided with an enlarged hub 14, designed to be constructed of brass, or other suitable material and arranged on the shaft or spindle and fitting in a recess 15, surrounding the socket 12. The inner or rear guard is also provided with a circular opening 16, corresponding with the annular recess 15 of the head or enlargement 7, as clearly shown in Fig. 2. The hub or enlargement enables the knife to be constructed as thin as desired, and at the same time affords a bearing of the desired size or thickness.

The rotary knife is equipped with gear teeth 17, formed by an annular series of openings 18 and meshing with projecting teeth 19 of a pinion 20. The pinion 20, which is located within a recess 21 of the handle, is mounted on a longitudinal shaft in a longitudinal bore or opening of the handle. The pinion 20 is secured to the longitudinal shaft 22 by a set screw 23, or other suitable means, and it operates through a slot 24 of the rear guard or plate. The longitudinal shaft is designed to be connected by a flexible connection with any suitable motive power for rotating the circular knife, which, however, may be operated by any other form of gearing, as will be readily understood. However, the gearing illustrated in the accompanying drawing is advantageous in that it lessens instead of increases the weight of the knife and enables a cutting blade as thin as desired to be employed and operated with the necessary power. Also the particular manner of mounting the guard on the handle maintains the guard rigidly in parallelism and enables the knife to be rotated with a minimum amount of friction.

Having thus fully described my invention, what I claim as new and desire to secure by Letters Patent, is:—

1. A skinning tool including a rotary knife, gearing for rotating the same, and a pair of spaced guards receiving the knife between them and provided with spaced projections or teeth located at opposite sides of the cutting edge of the knife and projecting outward beyond the same so as to prevent the cutting edge from coming in contact with the hide or skin, the teeth or projections being sufficiently short to permit the knife to freely engage and sever the tissue, which connects the hide with the flesh when the said projections or teeth are embedded in the tissue.

2. A skinning tool including a thin flat rotary blade, gearing for rotating the same, and spaced guards consisting of flat plates arranged in parallelism and receiving the knife between them, said guards being provided with peripheral projections or teeth spaced apart and located at opposite sides of the cutting edge of the knife and projecting beyond the same in parallel relation so as to prevent the knife from coming in contact with the skin or hide and being sufficiently short to permit the knife to engage and sever the tissue when they are embedded in the latter.

3. A skinning tool including a handle, a rotary knife consisting of a thin circular blade provided with teeth, parallel inner and outer guards spaced apart to receive the knife and connected with the handle and provided with projections or teeth located at both sides of the cutting edge of the knife and projecting outwardly beyond the same to prevent the knife from coming in contact with a skin or hide and being sufficiently short to enable the knife to engage and sever the tissue when they are embedded therein, one of the guards being also provided with a shaft or spindle upon which the knife is mounted, a pinion mounted on the handle and meshing with the teeth of the knife, and means for rotating the pinion.

4. A skinning tool including a handle provided at one end with a head having a socket, inner and outer guards consisting of thin flat plates arranged in parallelism and provided with teeth, the inner guard being secured to the head and having an opening, and the outer guard being provided with a shaft or spindle secured in the socket of the head and supporting the said outer guard, a knife consisting of a thin circular blade arranged between the inner and outer guards and having a hub mounted on the shaft or spindle, the cutting edge of the knife being prevented by the said teeth from coming in contact with the hide or skin and the teeth being sufficiently short to permit the knife to engage and sever the tissue when they are embedded in the latter, and gearing for rotating the knife.

5. A skinning tool including a handle provided with a head having a socket, said head being also provided with a recess surrounding the socket, a flat inner or rear guard secured to the head and provided with a central opening to correspond with the said recess and having a slot spaced from the central opening, a flat outer guard arranged in parallelism with the inner guard and secured to the handle and provided with a shaft or spindle fitted in the socket, said guards being provided with teeth, a fastening device piercing the head and securing the shaft or spindle in the socket, a knife consisting of a thin circular blade arranged between the said guards and having its cutting edge located between the said teeth and prevented by the same from coming in contact with a hide or skin and adapted to engage and sever the tissue when the teeth are embedded therein, said knife being provided with an annular series of openings to form teeth and having an enlarged hub mounted on the shaft or spindle and fitted within the recess of the head, and an interiorly arranged gear operating through the slot of the inner or rear guard and meshing with the head of the knife, and means for operating the gear.

In testimony whereof I affix my signature in presence of two witnesses.

FRANK JACKSON.

Witnesses:
Jos. H. Blackwood,
W. O. Blackwood.